United States Patent [19]
McGarry

[11] Patent Number: 5,286,446
[45] Date of Patent: Feb. 15, 1994

[54] COBALT-BASE ALLOY

[75] Inventor: Dennis L. McGarry, Granville, Ohio

[73] Assignee: Owens-Corning Fiberglas Technology Inc., Summit, Ill.

[21] Appl. No.: 997,065

[22] Filed: Dec. 28, 1992

[51] Int. Cl.[5] .......................................... C22C 30/00
[52] U.S. Cl. ..................................................... 420/588
[58] Field of Search .......................................... 420/588

[56] References Cited

U.S. PATENT DOCUMENTS

| | | |
|---|---|---|
| 3,933,484 | 1/1976 | Costin . |
| 4,497,771 | 2/1985 | Spencer et al. . |
| 4,618,474 | 10/1986 | Ohe et al. . |
| 4,761,169 | 8/1988 | Gaul . |
| 4,820,324 | 4/1989 | Gaul et al. . |

FOREIGN PATENT DOCUMENTS 224732  11/1985  Japan .................................. 420/588

*Primary Examiner*—Deborah Yee
*Attorney, Agent, or Firm*—Ted C. Gillespie; Patrick P. Pacella

[57] ABSTRACT

An alloy suitable for use as a spinner in forming glass fibers, the alloy being cobalt-based and including higher amounts of nickel and lower amounts of cobalt than used in typical cobalt-based superalloys.

9 Claims, 1 Drawing Sheet

COBALT-BASE ALLOY

TECHNICAL FIELD

This invention relates to a cobalt-base alloy particularly suitable for high temperature molten glass environments. More particularly, the alloy is useful as spinners for making glass fibers. Casting forms the alloy into spinners and other articles.

BACKGROUND ART

In certain industrial applications there is a need for alloys which possess high rupture strength, high corrosion resistance and high oxidation resistance at elevated temperatures. Among such applications is the glass or mineral fiber industry where filaments are produced by passing a molten mineral material, for example glass, through the foraminous walls of a chamber which is adapted for rotation at high speeds (the chamber being known as a spinner). The filaments are emitted through the fiberizing orifices in the walls due to the centrifugal action of the rotating spinner. Such spinners are typically operated, at temperatures on the order of about 2050° F. and rotation speeds on the order of 2050 RPM.

The advantages of being the low cost producer in any industry are enormous. Typically increased production or reduced costs in one area results in poor performance or increased cost in another area. Many ways exist to reduce costs in the production of glass fibers. Higher spinner rotational speeds increase production, but decrease spinner life. Stronger and more corrosion-resistant alloys help attain higher spinner speeds, but usually cost more.

Additional cost savings can be realized by fiberizing low cost batch formulations. But these have higher viscosities than normally used for glass wool insulation. The higher viscosities require higher fiberizing temperatures which in turn reduce spinner life.

DISCLOSURE OF THE INVENTION

I have broken this vicious cycle by developing a low cost cobalt-base alloy that has the high rupture strength, high corrosion-resistance and high oxidation resistance of it's more expensive cousins. I have developed a cobalt-base alloy with a high nickel content and a low cobalt content that behaves beautifully in the manufacture of glass fibers from molten glass. These alloys make great strides in the quest to be the low cost producer in the production of glass wool insulation.

BEST MODE OF CARRYING OUT INVENTION

The alloy of this invention can be prepared by vacuum-melting and vacuum-casting according to recognized melt procedures for cobalt-base alloys, sometimes known as superalloys. This alloy has the following approximate composition, the various components of this composition being expressed herein on a weight percent basis:

| Element | Approximate Compositions, Weight % |
| --- | --- |
| Chromium | About 25.0 to about 40.0 |
| Nickel | 15.0 to about 25.0 |
| Wolfram | About 0 to about 7.0 |
| Tantalum | About 0 to about 5.0 |
| Zirconium | About 0.1 to about 0.4 |
| Silicon | Present to about 0.8 |
| Carbon | About 0.2 to about 1.2 |
| Boron | About 0.005 to about 0.04 |
| Hafnium | 0.0 to about 1.0 |
| Aluminum | 0.0 to about 0.2 |
| Titanium | 0.0 to about 0.2 |
| Manganese | 0.0 to about 0.05 |
| Molybdenum | 0.0 to about 0.1 |
| Iron | 0.0 to about 2.0 |
| Cobalt | About 25.0 to 39.0 |

While I have given approximate amounts for each element, the lower limit for nickel and the upper limit for cobalt are key to the performance of my alloy.

The preferred composition of this invention is approximately as follows, on a weight percent basis:

| Element | Approximate Composition, Weight % |
| --- | --- |
| Chromium | About 35.0 to about 36.0 |
| Nickel | 18.01 to about 22.0 |
| Wolfram | About 5.5 to about 6.1 |
| Tantalum | About 2.2 to about 2.8 |
| Zirconium | About 0.17 to about 0.23 |
| Silicon | Present but about 0.13 max. |
| Carbon | About 0.70 to about 0.78 |
| Boron | About 0.008 to about 0.012 |
| Hafnium | About 0.60 to about 0.90 |
| Aluminum | 0.0 to about 0.2 |
| Titanium | 0.0 to about 0.2 |
| Manganese | 0.0 to about 0.01 |
| Molybdenum | 0.0 to about 0.1 |
| Iron | 0.0 to about 1.0 |
| Cobalt | About 30.0 to 36.0 |

The best mode of practicing the invention is represented by the following approximate composition on a weight percent basis:

| Element | Approximate Composition, Weight % |
| --- | --- |
| Chromium | About 3.5 |
| Nickel | 20.0 |
| Wolfram | About 5.8 |
| Tantalum | About 2.5 |
| Zirconium | About 0.20 |
| Silicon | About 0.10 |
| Carbon | About 0.74 |
| Boron | About 0.01 |
| Hafnium | About 0.7 |
| Aluminum | 0.0 to about 0.2 |
| Titanium | 0.0 to about 0.2 |
| Manganese | 0.0 to about 0.01 |
| Molybdenum | 0.0 to about 0.1 |
| Iron | 0.0 to about 1.0 |
| Cobalt | About 33.0 to 35.0 |

Figure 1:
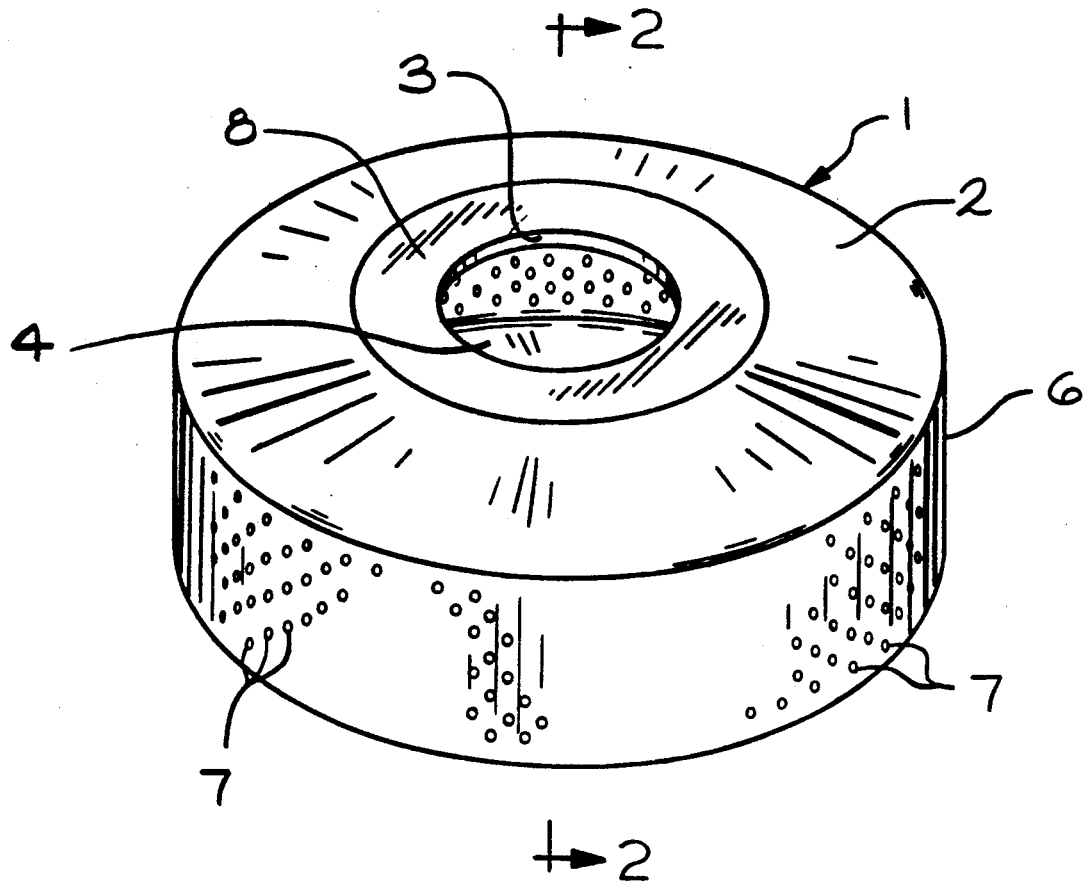
FIG. 1 is a perspective view of a spinner useful for producing glass wool insulation.
Figure 2:
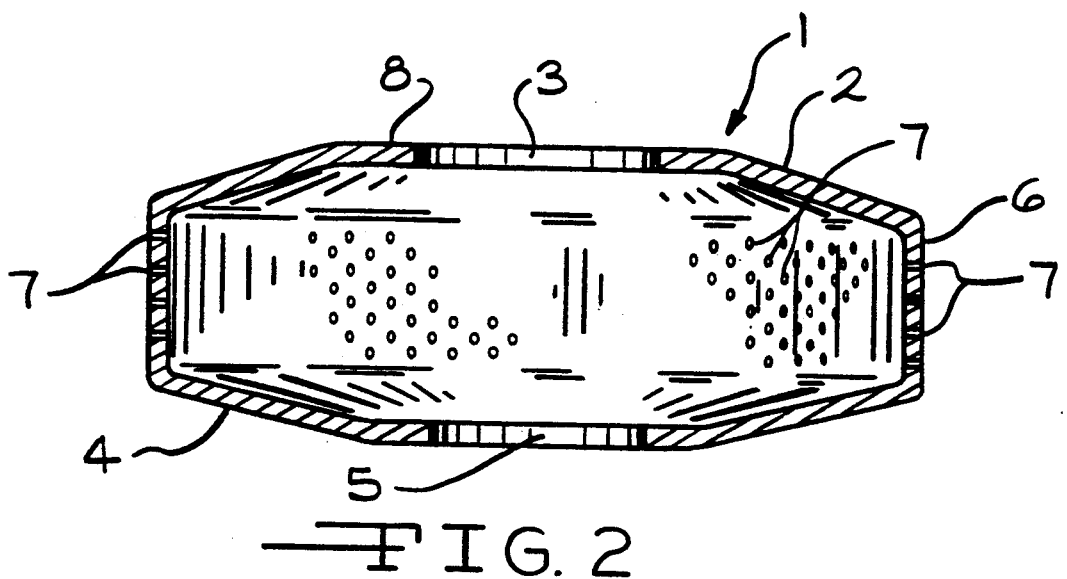
FIG. 2 is a sectional view of the spinner through section 2—2 of FIG. 1.

Referring now to FIGS. 1 and 2, there is shown spinner 1 fabricated in its entirety of the alloy of this invention.

Spinner 1 is comprised of an upper wall 2 having opening 3 therein and lower wall 4 having opening 5 therein. Continuous peripheral side wall 6 extends between upper wall 2 and lower wall 4 to form a substantially circular chamber. Side wall 6 is adapted with apertures 7 which penetrate the side wall and through which molten glass, introduced into the spinner through opening 3, is discharged.

As may apply in some spinner types, opening 3 can be adapted with flange 8 for connection to means, not shown, for rotating the spinner. The spinner can also be adapted with opening 5 for the extension therethrough of fluid introductory means, not shown.

While the preferred embodiment of practicing the invention is to fabricate spinner 1 in its entirety of the alloy of this invention, another embodiment is to cast only continuous peripheral side wall 6 from the alloy of this invention. Upper wall 2 and lower wall 4 then may be made from a different alloy compatible with the cobalt-base alloy of this invention. Frequently, the other alloy is a less expensive alloy.

The following will demonstrate the properties of the present invention.

The relative strengths of the above alloy of the present invention and prior art were determined by a standard stress-rupture test (American National Standard-/ASTM E-139-70 (reapproved 1978)). Average stress rupture performance under the conditions set forth demonstrates the comparable average life of the alloy of the present invention compared with the prior art alloy:

|  | Test Conditions | | Average | Average |
|---|---|---|---|---|
|  | Temp. (°F.) | Pressure (psi) | Life (Hours) | Creep Rate (in./in./hr.) |
| Alloy of present invention | 2100 | 4000 | 106 | $4.0 \times 10^{-4}$ |
| Prior art alloy | 2100 | 4000 | 111 | $4.3 \times 10^{-4}$ |

Even though the values for stress rupture life and minimum creep rate are not identical, there is no statistically significant difference. The number of data points for prior art is over 200. The number of data points for the present invention is 33. The stress rupture life standard deviations are 50 hours for the prior art and 30 hours for the present invention. The standard deviations for the logarithm of the creep rates are 0.376 and 0.25, respectively. The corrosion rate of the new alloy was measured in a laboratory test in which molten glass is pulled and pushed through a single hole in a coupon of the alloy. Extensive data of the prior art alloy is available for comparison.

The following test data demonstrates the average corrosion rate of the alloy of the present invention and of the prior art from laboratory corrosion tests.

| Alloy | Corrosion Rate (mil/200 hr.) |
|---|---|
| Alloy of the present invention | 10.0 |
| Prior art alloy | 10.8 |

I achieved these results with an alloy having a high nickel content and a low cobalt content. The prior art alloy contained standard amounts of nickel and cobalt for typical cobalt based superalloys; e.g. 10 to 15 weight percent nickel and 42 to 44 weight percent cobalt. The balance of prior art alloy is essentially the same as the alloy of the present invention.

The alloys of the present invention also have low temperature (below 1500° F.) ductility and better room temperature ductility than the prior art alloy. Room temperature tensile ductility of the best mode alloy was twice the ductility of the prior art alloy.

Cobalt prices are typically 3 to 5 times the price of nickel. Cobalt is a strategic metal and is produced mainly in countries with unstable governments. During political crises, the price of cobalt has been as much as 8 times that of nickel. This discovery, that nickel levels above current prior art levels are not detrimental, allows significant alloy cost reduction while maintaining required properties.

The table below lists the savings at some historical extreme values of cobalt price and an expected value. Costs of alloying elements other than nickel and cobalt are not listed but are used to calculate the total alloy costs.

| Nickel price $/lb. | Cobalt price $/lb. | Prior Art Alloy Price $/lb. | Invention Alloy Price $/lb. | Savings % |
|---|---|---|---|---|
| 3.50 | 9 (low) | 8.10 | 8.35 | 9 |
| 3.50 | 30 (high) | 17.20 | 13.50 | 22 |
| 3.50 | 15 (expected) | 10.70 | 9.0 | 15 |

The savings range 9% to 22% with an expected typical savings of 15%.

I claim:

1. As a composition of matter of glass corrosion-resistant, high-strength alloy consisting essentially of the following elements in approximate amounts expressed in weight percent:

| Element | Approximate Compositions, Weight % |
|---|---|
| Chromium | About 34.0 to about 38.0 |
| Nickel | Greater than 15.0 to about 25.0 |
| Tungsten | About 4.0 to about 7.0 |
| Tantalum | About 2.0 to about 5.0 |
| Zirconium | About 0.1 to about 0.4 |
| Silicon | 0 to about 0.8 |
| Carbon | About 0.2 to about 1.2 |
| Boron | About 0.005 to about 0.04 |
| Hafnium | About 0 to about 1.0 |
| Aluminum | 0.0 to about 0.2 |
| Titanium | 0.0 to about 0.2 |
| Manganese | 0.0 to about 0.05 |
| Molybdenum | 0.0 to about 0.1 |
| Iron | 0.0 to about 2.0 |
| Cobalt | About 25.0 to 39.0. |

2. The composition of claim 1 in which said elements are contained in the following approximate amounts expressed in weight percent:

| Element | Approximate Composition, Weight % |
|---|---|
| Chromium | About 35.0 to about 36.0 |
| Nickel | 18.01 to about 22.0 |
| Tungsten | About 5.5 to about 6.1 |
| Tantalum | About 2.2 to about 2.8 |
| Zirconium | About 0.17 to about 0.23 |
| Silicon | Present but about 0.13 max. |
| Carbon | About 0.70 to about 0.78 |
| Boron | About 0.008 to about 0.012 |
| Hafnium | About 0.60 to about 0.90 |
| Aluminum | 0.0 to about 0.2 |
| Titanium | 0.0 to about 0.2 |
| Manganese | 0.0 to about 0.01 |
| Molybdenum | 0.0 to about 0.1 |
| Iron | 0.0 to about 1.0 |
| Cobalt | About 30.0 to 36.0. |

3. The composition of claim 1 in which said elements are contained in the following approximate amounts expressed in weight percent:

| Element | Approximate Composition, Weight % |
|---|---|
| Chromium | About 35.5 |
| Nickel | 20.0 |
| Tungsten | About 5.8 |
| Tantalum | About 2.5 |
| Zirconium | About 0.20 |
| Silicon | About 0.10 |
| Carbon | About 0.74 |
| Boron | About 0.01 |
| Hafnium | About 0.7 |
| Aluminum | 0.0 to about 0.2 |
| Titanium | 0.0 to about 0.2 |
| Manganese | 0.0 to about 0.01 |
| Molybdenum | 0.0 to about 0.1 |
| Iron | 0.0 to about 1.0 |
| Cobalt | About 33.0 to 35.0. |

4. An article of manufacture produced by casting the composition of matter defined by claim 1.

5. An article of manufacture produced by casting the composition of matter defined by claim 2.

6. An article of manufacture produced by casting the composition of matter defined by claim 3.

7. A spinner for forming glass fibers from molten glass comprising an apertured wall formed from a high-strength alloy consisting essentially of the following elements in approximate amounts expressed in weight percent:

| Element | Approximate Compositions, Weight % |
|---|---|
| Chromium | About 34.0 to about 38.0 |
| Nickel | Greater than 15.0 to about 25.0 |
| Tungsten | About 4.0 to about 7.0 |
| Tantalum | About 2.0 to about 5.0 |
| Zirconium | About 0.1 to about 0.4 |
| Silicon | Present but about 0.15 max. |
| Carbon | About 0.65 to about 0.95 |
| Boron | About 0.005 to about 0.04 |
| Hafnium | About 0.4 to about 1.0 |
| Aluminum | 0.0 to about 0.2 |
| Titanium | 0.0 to about 0.2 |
| Manganese | 0.0 to about 0.05 |
| Molybdenum | 0.0 to about 0.1 |
| Iron | 0.0 to about 2.0 |
| Cobalt | About 25.0 to 39.0 |

8. The spinner of claim 7 in which said alloy contains the following elements in approximate amounts expressed in weight percent:

| Element | Approximate Composition, Weight % |
|---|---|
| Chromium | About 35.0 to about 36.0 |
| Nickel | 18.01 to about 22.0 |
| Tungsten | About 5.5 to about 6.1 |
| Tantalum | About 2.2 to about 2.8 |
| Zirconium | About 0.17 to about 0.23 |
| Silicon | Present but about 0.13 max. |
| Carbon | About 0.70 to about 0.78 |
| Boron | About 0.008 to about 0.012 |
| Hafnium | About 0.60 to about 0.90 |
| Aluminum | 0.0 to about 0.2 |
| Titanium | 0.0 to about 0.2 |
| Manganese | 0.0 to about 0.01 |
| Molybdenum | 0.0 to about 0.1 |
| Iron | 0.0 to about 1.0 |
| Cobalt | About 30.0 to 36.0. |

9. The spinner for forming glass fibers from molten glass comprising an apertured wall formed from a high-strength alloy consisting essentially of the following elements in approximate amounts expressed in weight percent:

| Element | Approximate Composition, Weight % |
|---|---|
| Chromium | About 35.5 |
| Nickel | 20.0 |
| Wolfram | About 5.8 |
| Tantalum | About 2.5 |
| Zirconium | About 0.20 |
| Silicon | About 0.10 |
| Carbon | About 0.74 |
| Boron | About 0.01 |
| Hafnium | About 0.7 |
| Aluminum | 0.0 to about 0.2 |
| Titanium | 0.0 to about 0.2 |
| Manganese | 0.0 to about 0.01 |
| Molybdenum | 0.0 to about 0.1 |
| Iron | 0.0 to about 1.0 |
| Cobalt | About 33.0 to 35.0. |

* * * * *